United States Patent
McCord

[15] 3,681,969
[45] Aug. 8, 1972

[54] SURFACE TREATING APPARATUS
[72] Inventor: Donald M. McCord, Greenville, S.C.
[73] Assignee: Phillips Fibers Corporation
[22] Filed: Jan. 29, 1971
[21] Appl. No.: 110,970

[52] U.S. Cl. .................................................. 73/7
[51] Int. Cl. ............................................. G01n 3/56
[58] Field of Search ................................... 73/7, 9

[56] References Cited

UNITED STATES PATENTS

| | | | |
|---|---|---|---|
| 2,032,202 | 2/1936 | Dennis | 73/7 |
| 3,364,726 | 1/1968 | Bonham | 73/7 |
| 3,286,505 | 11/1966 | Penman et al. | 73/7 |

Primary Examiner—Louis H. Prince
Assistant Examiner—Daniel M. Yasich
Attorney—Young & Quigg

[57] ABSTRACT

An apparatus having an upper and a lower frame rotatably connected one to the other, at least three rotatable bearing elements rotatably attached to the lower frame portion, and a reciprocating means attached to the upper frame portion for reciprocating the frame and rotating associated bearing elements along the surface to be tested. A means is provided for rotating the lower portion of the frame and the associated bearing elements relative to the upper portion of the frame during reciprocation of the frame.

7 Claims, 5 Drawing Figures

PATENTED AUG 8 1972　　　　　　　　　　　　　3,681,969

INVENTOR.
D.M. MC CORD

BY *Young & Quigg*

ATTORNEYS

SURFACE TREATING APPARATUS

It is desirable to provide an apparatus for testing a surface for wear resistance. Such surfaces can be carpeting, paint, varnish, enamel, and cloth, for example. It is also desirable to test the surface by moving a weighted surface over the test surface in a uniform, nonlinear pathway in order to more exactly assimilate normal bearing contact exerted on the surface of material during normal use thereof. The apparatus of this invention is particularly adapted for use in carpet testing, testing of a carpet backing positioned beneath a carpet, and its lamination to the primary carpet.

Therefore, this invention is an apparatus having at least three bearing elements that are rotatably in contact with a material testing surface and having apparatus associated therewith for moving the bearing elements along a nonlinear pathway in contact with and relative to the testing surface.

Other aspects, objects, and advantages of the present invention will become apparent from a study of the disclosure, the appended claims, and the drawing.

The drawings are diagrammatic views in partial section of the apparatus of this invention.

Figure 1:
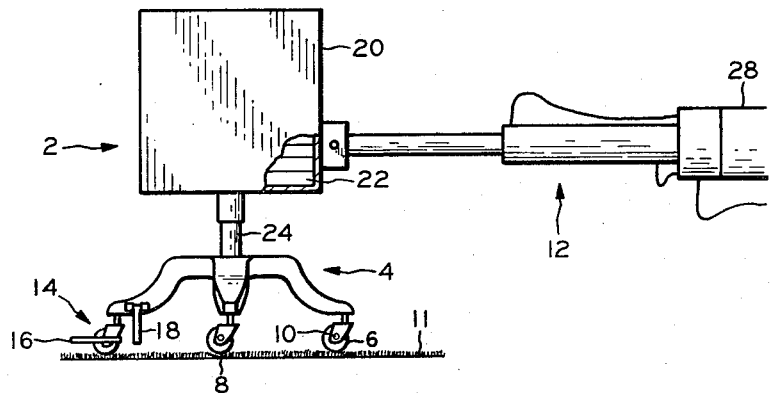
FIG. 1 shows the apparatus of this invention.

Referring to FIG. 1, the surface testing apparatus has an upper frame portion 2 rotatably connected to a lower frame portion 4. In order to provide an apparatus of greater stability, it is preferred that the frame portions 2,4 be rotatably connected one to the other at about the geometric center of each portion. This connection can be any rotatable connection as known in the art which permits 360° rotation of the lower frame portion 4 in both clockwise and counterclockwise directions relative to the upper frame portion 2. The connection should also be such that rotation of one portion relative to the other requires a relatively small force when one frame portion is urged toward the other by a force of a few hundred pounds. This connection can be easily constructed by using, for example, Teflon bearings between the frame portions 2,4.

At least three rotatable bearing surfaces 6, preferably four or more bearing elements, each having a bearing surface 8 and an axis 10 are rotatably connected to the lower frame portion 4 at locations laterally spaced one from the other. Each of the bearing elements 6 is rotatable about its respective axis 10 and, in addition, is rotatable relative to the lower frame portion 4. The rotatable connection of each bearing element 6 to the lower frame portion 4 is preferably similar to the rotatable connections between the frame portions 2 and 4 in order that each bearing element 6 can easily be rotated 360° relative to the lower frame portion 4 during rotation of each bearing element 6 about its axis 10 with its bearing surface in contact with the surface 11 to be tested. The bearing elements 6 should also be connected to the lower frame portion at locations laterally spaced relative to its respective axis to assure rotation of the element relative to the frame portion 4.

Figure 3:
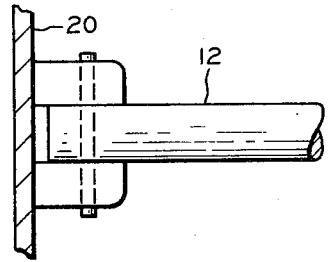
FIG. 3 shows a top view of a pivotal connection between the reciprocating means and the upper frame portion.

A reciprocating means 12, such as, for example, a double-acting hydraulic cylinder is attached to the upper frame portion 2 for reciprocating the frame 2, for rotating the bearing elements about their axis, and passing the bearing surfaces 8 along the test surface 11. The reciprocating means 12 is preferably connected to the upper frame portion 2 in a manner to prevent lateral movement of the upper frame portion 2 relative to the reciprocating means 12 during operation thereof. By so connecting the element to prevent lateral movement, more control over rotation of the lower frame portion 4 is achieved. In order to prevent intermittent additional loading of a portion of the bearing elements, the connection of the reciprocating means 12 to the upper frame portion, as shown in FIG. 3, can be a pivotal connection for pivoting through a preselected vertical distance as shown in FIG. 3.

Figure 4:
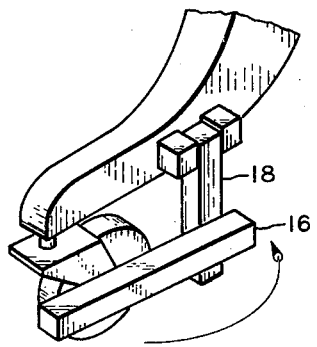
FIG. 4 shows a stop bar at the first position.
Figure 5:
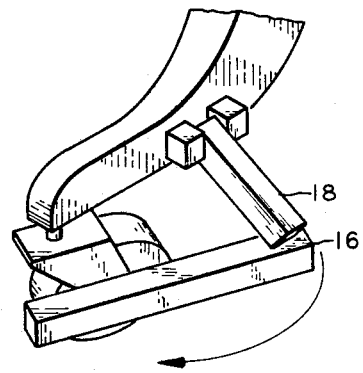
FIG. 5 shows the stop bar at the second position.

A means 14 is provided on the apparatus for intermittently rotating the lower portion of the frame 4 and associated bearing element 6 relative to the upper frame portion 2 during reciprocation of the frame 2,4 and the bearing element 6 along the test surface 11. That means 14 can be a gear and cam arrangement, as known in the art. It has been found, however, that a uniquely simple means 14 can be constructed to cause the lower frame portion 4 to intermittently rotate through an arc. In that construction, as shown in FIG. 1, an actuating bar 16 is fixedly attached to one of the bearing elements 6 through the bearing element mount and extends laterally outwardly therefrom preferably in a direction perpendicular to the axis 10 of the bearing element 6 and outwardly from the connection of the bearing element to the frame and the bearing element 6. A stop bar 18 is pivotally attached to the lower frame portion 4 at a location between the connection of the upper and lower frame portions and said bearing element 6. The stop bar 18 extends downwardly from the lower frame portion 4 in the pathway of the actuating bar 16 rotating relative to the lower frame portion 4. The stop bar 18 is pivotally movable between a first position, shown in FIG. 4, at which the stop bar 18 is extending downwardly from the frame 4 in contact with the actuation bar 16 and maintaining the bearing element 6 associated therewith from rotating in one direction relative to the lower frame portion 4, and a second position, shown in FIG. 5, at which the stop bar 18 is pivoted outwardly by the actuation bar 16 for permitting rotation of the actuation bar 16 and associated bearing element in the other direction.

The upper portion of the frame 2 is preferably provided with a platform, container, or other means 20 for removably maintaining a plurality of weighting elements 22 for providing means for altering the force exerted against the surface 11 by the bearing element 6.

In order to provide a balanced, smoothly operating apparatus, it is preferred that each bearing element 6 on the frame lower portion 4 be spaced a substantially equal, arcuate distance one from the other and a substantially equal, radial distance from an axis 24 or a center of rotation of the lower frame portion 4 relative to the upper frame portion 2.

Figure 2:
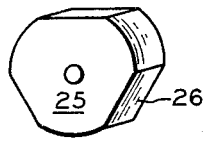
FIG. 2 shows another embodiment of a bearing element of the apparatus.

The bearing element 6 can be a roller as shown in FIG. 1 or a modified roller 25 as shown in FIG. 2 where the bearing surface 6 of at least one of the bearing elements 6 has at least one planar surface 26. By providing such a modified roller 25, a force can be produced on the testing surface 11 that assimilates the force exerted by the heel of a shoe of a person.

It is also preferred that a counter 28 can be associated with the reciprocating means in order that the number of strokes of the bearing elements can be recorded during testing and thereby provide test data.

In the operation of the apparatus, the reciprocating means 12 is actuated and moves the frame portions 2,4 in a pathway back and forth along the test surface 11 with the bearing element 6 in contact therewith. A preselected number of weighting elements 22 can be placed on the upper frame portion 2 to assimilate different loading conditions and bearing forces on the test surface 11. Owing to the construction of the bearing elements 6, said elements rotate relative to the lower frame portion 4 during each direction change of the frame 2 by the reciprocating means 12. During these rotations of the bearing element 6, the actuating bar 16 is intermittently rotated in a direction for contacting the stop bar 18 at the first position thereby causing the lower frame portion 4 and associated bearing element 6 to rotate relative to the upper frame portion 2. This rotation is through various degrees depending upon many factors such as the smoothness of the testing surface 11, the amount of weight exerted on the bearing element 6, the speed of reciprocation, etc.

After so rotating the lower frame portion 4 and associated bearing element 6, further movement by the reciprocating means and passes the bearing element 6 along a different pathway.

By testing a surface 11 with the apparatus of this invention, the tested surface area is of a width equal to the separation of the bearing elements and a length equal to the length of reciprocation. Such a broad area relative to the surface area tested by heretofore utilized apparatus produces more accurate analysis. The test procedure and conditions can also be easily adjusted to the type of material being tested by installing bearing elements of different dimensions and construction, altering the weight imposed on the test surface, adjusting the speed of reciprocation, and providing tilt at each end of the stroke where desired by providing a pivotal coupling between the reciprocating means and the frame.

Reciprocating means 12 can also comprise a rotating crank and connecting rod assembly or other well known means for obtaining such motions.

Other modifications and alterations of this invention will become apparent to those skilled in the art from the foregoing discussion and accompanying drawing, and it should be understood that this invention is not to be unduly limited thereto.

What is claimed is:

1. A surface testing apparatus, comprising:
   a frame having upper and lower portions rotatably connected one to the other;
   at least three rotatable bearing elements each rotatable about a different axis and each having a bearing surface, each of said bearings being rotatably connected to the lower portion of the frame at locations laterally spaced from each bearing element's respective axis and laterally spaced one from the other for rotation of the bearing elements relative to the lower portion of the frame during rotation of the bearing elements about their respective axis with each bearing surface in contact with the test surface;
   reciprocating means attached to the upper portion of the frame for reciprocating the frame, causing the bearing elements to rotate about their axis, and moving the bearing surfaces of said elements along the test surface; and
   means for intermittently rotating the lower portion of the frame and associated bearing elements relative to the upper portion of the frame during reciprocation of the frame and the bearing elements along the test surface.

2. An apparatus, as set forth in claim 1, wherein each of the bearing elements on the lower portion of the frame is spaced a substantially equal, arcuate distance one from the other and a substantially equal, radial distance from an axis of rotation of the lower portion of the frame relative to the upper portion of the frame.

3. An apparatus, as set forth in claim 1, wherein the bearing element is a roller.

4. An apparatus as set forth in claim 1, wherein the bearing surface of at least one of the rotatable bearing elements has at least one planar surface thereon.

5. An apparatus, as set forth in claim 1, including means on the upper portion of the frame for maintaining a weighting element thereon.

6. An apparatus, as set forth in claim 1, wherein the reciprocating means is a double-acting cylinder.

7. An apparatus, as set forth in claim 1, wherein the means for rotating the lower portion of the frame and associated bearing elements comprises an actuation bar fixedly attached to one of the bearing elements and extending laterally outwardly therefrom and a stop bar pivotally attached to the lower portion of the frame between the connection of the upper and lower frame portions and said bearing element and extending downwardly therefrom in the pathway of the actuation bar, said stop bar being pivotally movable between a first position at which the stop bar is extending downwardly from the frame in contact with the actuation bar and maintaining the bearing element associated therewith from rotation in one direction relative to the frame and a second position at which the stop bar is pivoted outwardly by the actuation bar for permitting rotation of the actuation bar and associated bearing element in the other direction.

* * * * *